(12) United States Patent
Lay

(10) Patent No.: US 7,264,543 B2
(45) Date of Patent: Sep. 4, 2007

(54) DEVICE FOR CUTTING FREE THE COLON OF A SLAUGHTER ANIMAL

(75) Inventor: Norbert Lay, Bondorf (DE)

(73) Assignee: Schmid & Wezel GmbH & Co, Maulbronn (DE)

( * ) Notice: Subject to any disclaimer, the term of this patent is extended or adjusted under 35 U.S.C. 154(b) by 0 days.

(21) Appl. No.: 11/282,583

(22) Filed: Nov. 21, 2005

(65) Prior Publication Data

US 2006/0099898 A1    May 11, 2006

Related U.S. Application Data

(63) Continuation of application No. PCT/EP2005/011347, filed on Oct. 21, 2005.

(30) Foreign Application Priority Data

Dec. 7, 2004    (DE) ................ 20 2004 019 195 U

(51) Int. Cl.
*A22C 21/06*    (2006.01)
*A22C 17/14*    (2006.01)
(52) U.S. Cl. ...................... 452/122; 452/120
(58) Field of Classification Search ................ 452/107, 452/120, 121, 122, 123, 150, 153, 154, 155, 452/156, 173; 606/180
See application file for complete search history.

(56) References Cited

U.S. PATENT DOCUMENTS 3,526,018 A    9/1970   Lovitt
3,634,908 A *  1/1972   Chamberlain ............... 452/109
3,921,255 A * 11/1975   LaBarber .................... 452/109
3,975,796 A *  8/1976   LaBarber .................... 452/116
5,167,568 A * 12/1992   Esbroeck et al. ........... 452/116
5,181,878 A *  1/1993   Bekkers ...................... 452/109
5,199,922 A *  4/1993   Korenberg et al. ......... 452/122
5,419,738 A    5/1995   Lysbo
5,512,044 A *  4/1996   Duer .......................... 604/22
6,641,475 B1  11/2003   Nielsen

FOREIGN PATENT DOCUMENTS

| EP | 0 307 550 | 3/1989 |
|---|---|---|
| EP | 0 492 735 | 7/1992 |
| EP | 0 723 743 | 7/1996 |
| EP | 1 027 829 | 8/2000 |
| EP | 1 115 292 | 7/2001 |

* cited by examiner

*Primary Examiner*—David Parsley
(74) *Attorney, Agent, or Firm*—Paul Vincent

(57) ABSTRACT

A device for cutting free the colon of a slaughter animal has a cylindrical cutting knife and a guiding arbor with a suction channel. The device has two components, one of which is a tool and the other a robot connecting plate. The robot connecting plate has a connecting opening for vacuum, a connecting opening for water, a connecting opening for pressurized air to drive the pressurized air motor, and a connecting opening for exhaust air from the pressurized air motor. The connecting openings are connected to associated channels or passages in the tool in the assembled state of the tool and the robot connecting plate.

19 Claims, 8 Drawing Sheets

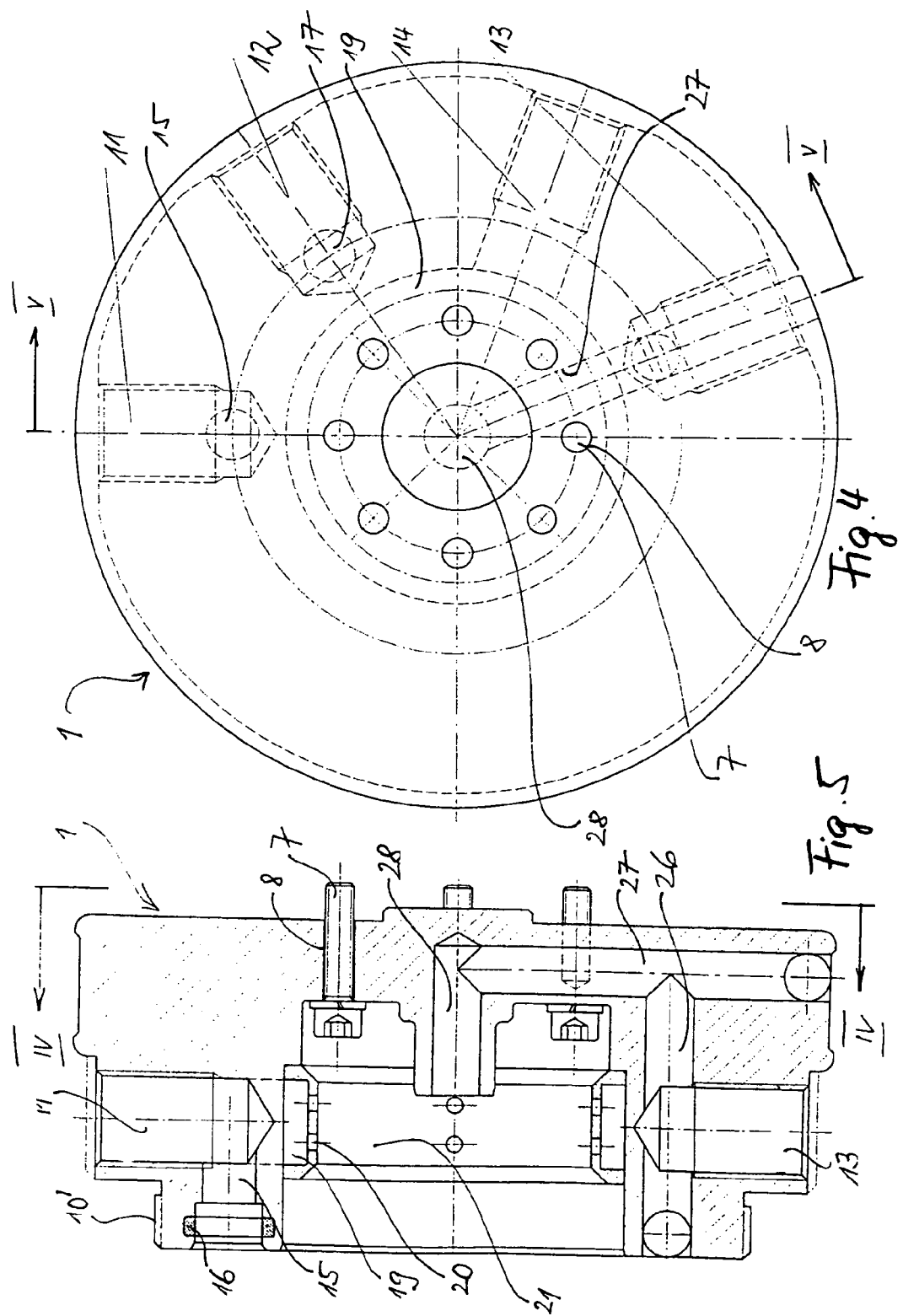

DEVICE FOR CUTTING FREE THE COLON OF A SLAUGHTER ANIMAL

This application is a continuation of PCT/EP2005/011347 filed on Oct. 21, 2005 and claims Paris Convention priority of DE 20 2004 019 195.4 filed Dec. 07, 2004 the entire disclosures of which are hereby incorporated by reference.

BACKGROUND OF THE INVENTION

The invention concerns a device for cutting free the colon of a slaughter animal using a hollow cylindrical cutting knife which is driven for rotation, with a guiding arbor, having a suction channel, being disposed within the hollow cylindrical cutting knife, wherein the rotational drive for the cutting knife and the guiding arbor is effected by a pressurized air motor.

These types of device are known in the art (EP1115292B1, EP0457408A1).

It is the underlying purpose of the invention to improve, in a straightforward fashion, the method of operation of a device of this kind as well as the guiding and the cleaning of the device.

SUMMARY OF THE INVENTION

This purpose is achieved in accordance with the invention in that the device has two components, namely a tool and a robot attachment plate, which are joined together in a separable fashion, wherein the robot attachment plate has a connecting opening for vacuum, a connecting opening for water, a connecting opening for pressurized air to drive the pressurized air motor, and a connecting opening for exhaust of the pressurized air motor, wherein, in the assembled state of the tool and the robot attachment plate, the above mentioned openings are connected to associated channels in the tool in such a fashion that
  (a) when a vacuum is applied to the vacuum connecting openings in the robot connecting plate, a connection is effected between the vacuum connecting openings and the suction conduit in the guiding arbor,
  (b) when water is introduced to the water connecting openings in the robot connecting plate, a rinsing and washing of the suction conduit, its associated channels as well as the interior of the bushing bearing the cutting knife and/or the cutting knife occurs,
  (c) the pressurized air motor is driven in response to the application of pressure to the connecting openings for pressurized air fashioned in the robot connecting plate,
  (d) and exhaust air from the pressurized air motor is evacuated by means of the connecting opening for exhaust air fashioned in the robot connecting plate.

The invention also concerns a cutting knife particularly suited for such a device as well as a method for cutting free the colon of a slaughter animal.

Advantageous improvements of the invention are defined in the dependent claims.

In accordance with the invention, the device can be guided in a precise manner by means of a robot and can be easily cleaned in a separate sterilization device while simultaneously washing the hollow regions and the cavities and channels provided in the tool. Exchange of the tool for purposes of repair or replacement of the cutting knife is straightforward. The dimensions of the cutting knife as well as the choice of material are effective and lead to particularly low wear.

An embodiment of the invention is described in detail in the associated drawings.

BRIEF DESCRIPTION OF THE DRAWING

FIG. 4 is a view onto the robot attachment plate (1) from the upper right of FIG. 1 and 2 and in the direction of arrow IV—IV of FIG. 5;

FIG. 5 is a section in the direction of arrow V—V of FIG. 4;

DESCRIPTION OF THE PREFERRED EMBODIMENT

Figure 1:
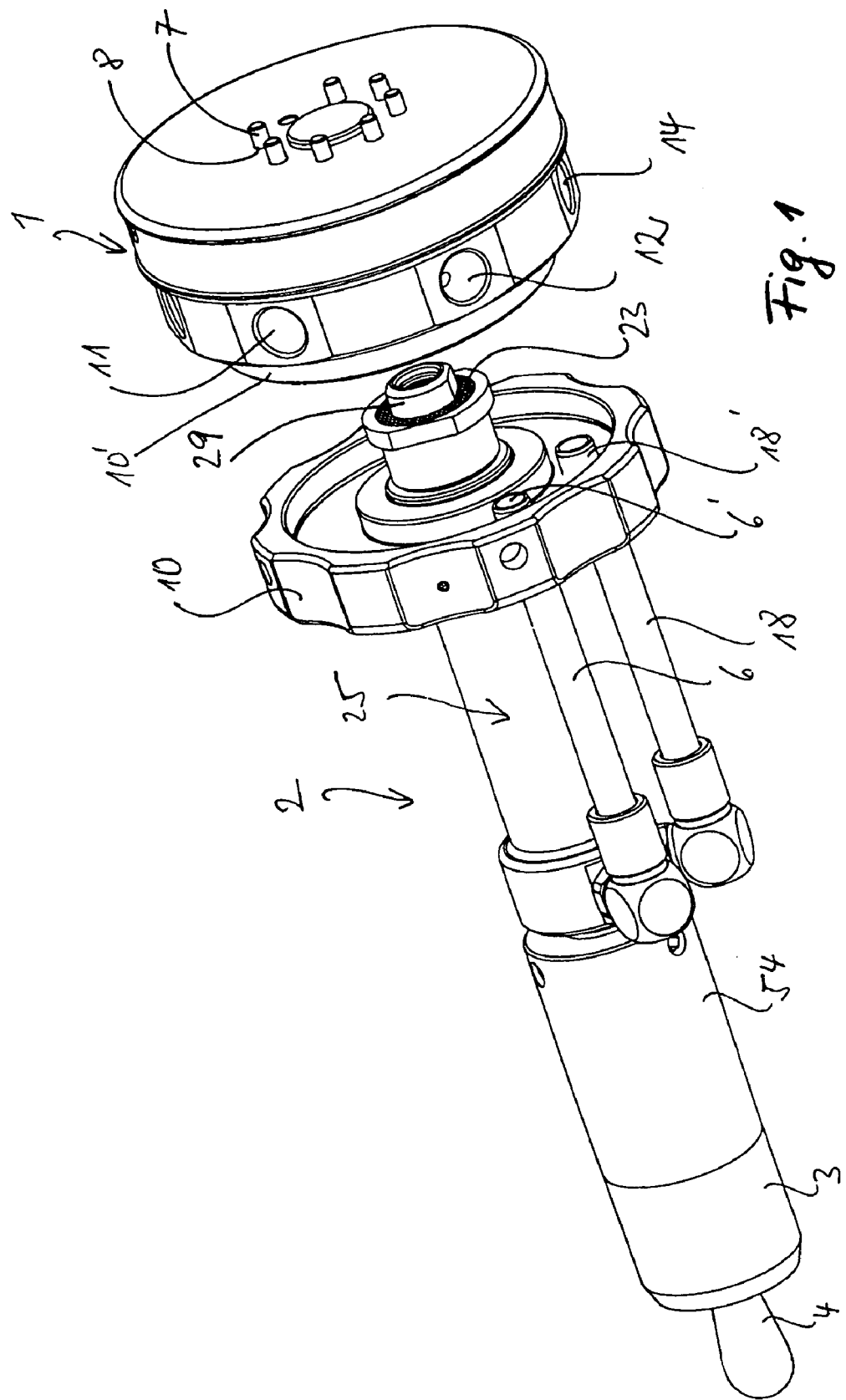
FIG. 1 is a perspective exploded view of an embodiment.
Figure 2:
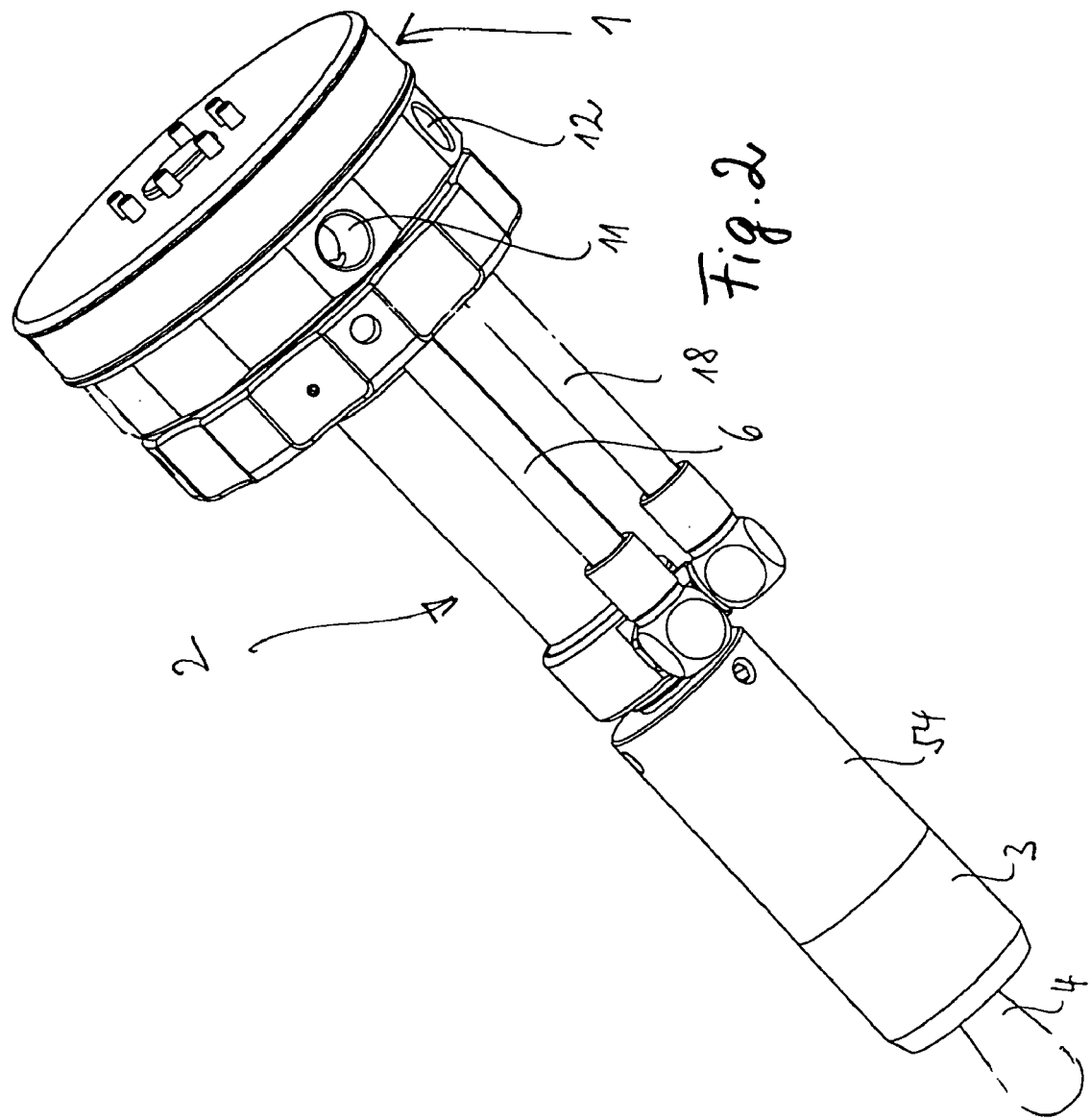
FIG. 2 is a perspective representation of the embodiment of FIG. 1 in the assembled state of the tool (2) and the robot connecting plate (1)

The embodiment according to FIG. 1 consists essentially of a robot attachment plate 1 and a tool 2. The tool 2 is a cutting tool for cutting free the colon of slaughter animals by means of which the colon of a slaughter animal, for example a pig, is separated from the surrounding tissue prior to slicing through the animal. Towards this end, a guiding arbor 4 is introduced into the rectum and the rotationally driven hollow cylindrical cutting knife 3 is guided along the tailbone and spine of the slaughter animal. The guiding arbor 4 has a suction channel 5 disposed therein in order to secure the colon while evacuating the contents of the intestine (fecal material) via the vacuum connection tube 6 and simultaneously cutting free the colon.

When the slaughter animal, hung from its rear legs, is subsequently separated into two halves through cutting open the abdominal wall, the entire intestine can be removed from the slaughter animal along the cut location, since the colon is cut free from the adjacent tissue (compare EP0954791 and AU573603A1).

The robot attachment plate 1 is securely connected and bolted to a robot (not shown) using screws 7 which pass through openings 8 in the attachment plate 1 (see FIGS. 4 and 5) so that the entire device can be guided by a robot along the tailbone and spine of the slaughter animal during the cutting procedure in a precisely desired fashion by means of automatic pattern and image recognition. The tool 2 is bolted to the robot attachment plate 1 by means of a union nut 10 and a thread 10' on the robot attachment plate 1 (see FIG. 5). The robot attachment plate (see also FIG. 4) has the following connecting openings: a connecting opening 11 for the application of vacuum for suctioning the colon and for evacuating its contents, a connecting opening 12 for water to rinse the device, a connecting opening 13 for pressurized air to drive the pressurized air motor 25 which drives the cutting knife 3 and the guiding arbor 4, as well as a connecting opening 14 for removal of exhaust air from the pressurized air motor.

As can be seen from FIG. 5, the connecting opening 11 for vacuum is connected to the channel 15. In the assembled state of the tool 2 and the robot attachment plate 1, the end 6' of the vacuum connecting tube 6 of the tool 2 penetrates into the channel 15 (compare FIG. 6) and is sealed by means of a seal 16.

The connecting opening 12 for water is connected to the channel 17 and an end 18' of a water connecting tube 18 of the tool 2 penetrates into and is likewise sealed (see FIG. 1) at the channel 17 (see FIG. 1).

In the assembled state of the tool 2 and the robot attachment plate 1, the connecting opening 13 for pressurized air to drive the pressurized air motor 25 is connected to the interior region 29' of a connecting bushing 29 (FIGS. 3, 6 and 9) by means of channels 27 and 28.

The connecting opening 14 for removal of the exhaust air from the pressurized air motor 25 in the tool 2 is connected to the annular region 19 which, in turn, communicates with the annular region 21 via openings 20 (see FIG. 5). When the tool 2 and the robot connecting plate 1 are assembled, this latter region 21 is connected to an annular region 22 in the tool 2. The annular region 22 is connected to the exhaust channels 24 of the air pressurized motor 25. A baffle plate 23 is disposed there between.

A seal 31 in the connecting bushing 29 seals the pressurized air intake via channel 28 with respect to the angular region 21.

Figure 3:
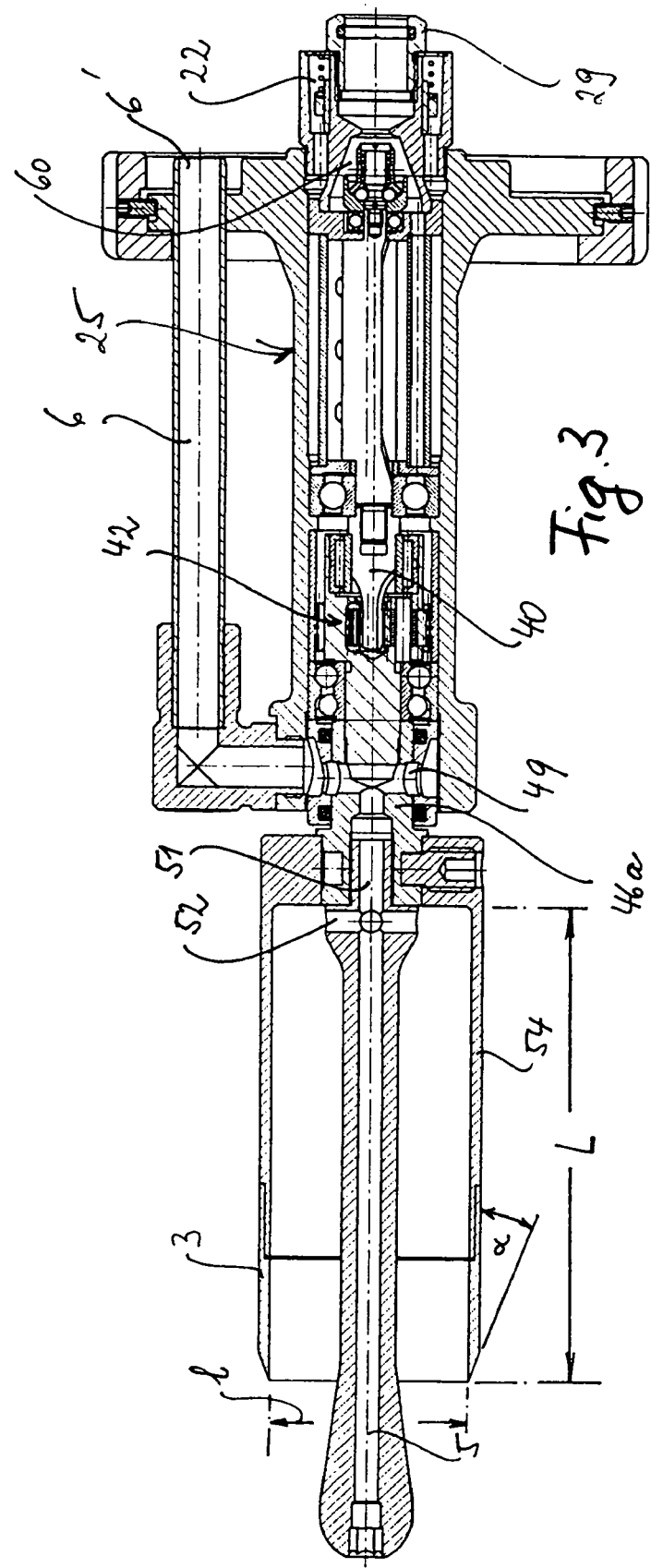
FIG. 3 is a section through the tool (2) shown in FIG. 1.
Figure 9:
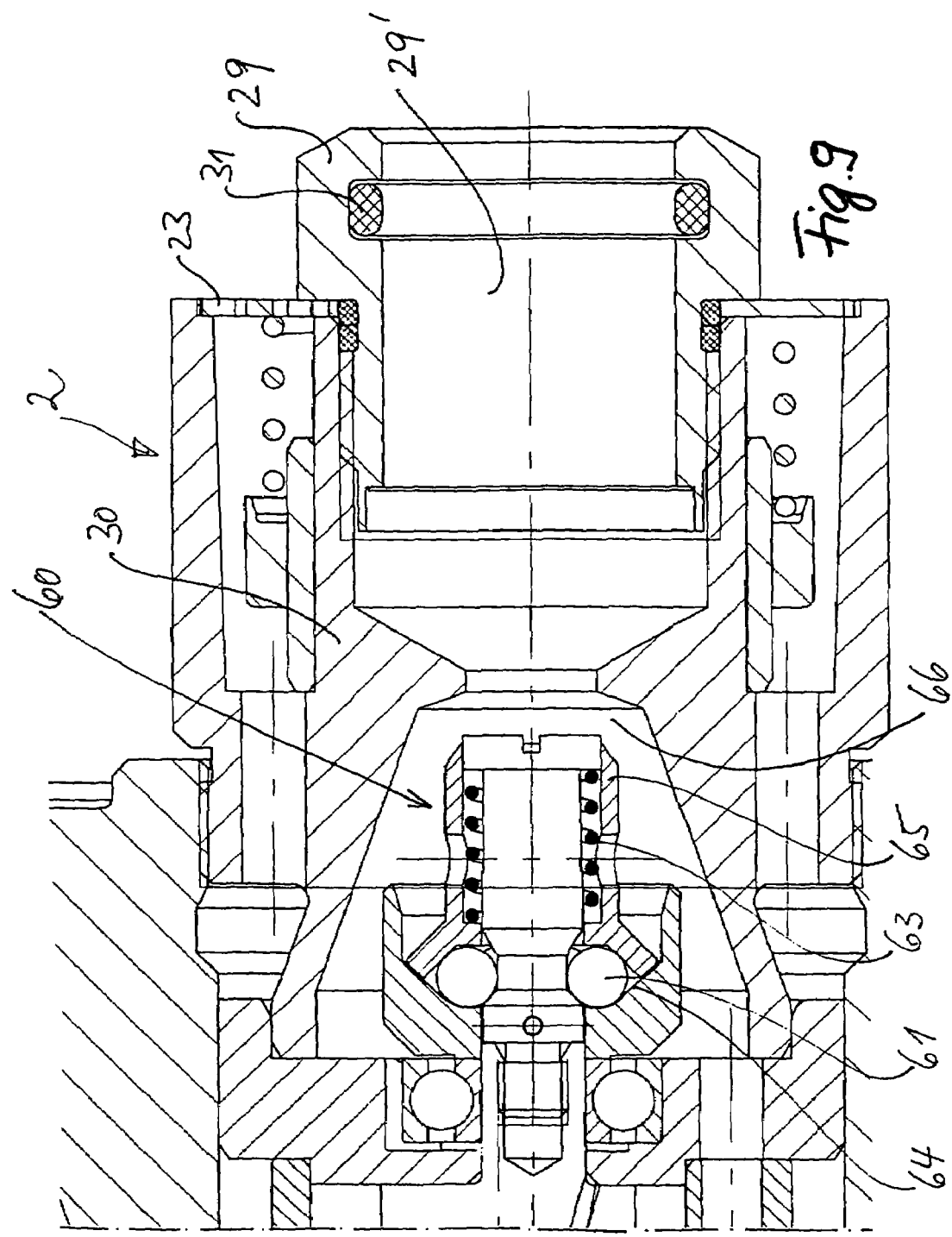
FIG. 9 is an enlarged region of FIG. 6.

The following description concerns FIG. 3 (in detail, FIG. 9). The pressurized regulation valve 60 disposed in the housing 30 has balls 61 which, with increasing rate of revolution, are urged in an outward direction in opposition to the force of the spring 63 and, in consequence of the slanting surfaces 64, displace the bushing 65 towards the right to reduce the passage cross-section 66 for the pressurized air and the rate of revolution.

The precise position of the tool 2 on the robot connecting plate 1 is defined by the engagement of the end 6' of the vacuum tube 6 and the end 18' of the water connecting tube 18 in the associated channels. It is also of course possible to provide only one type of attachment of this kind. However, the double attachment presented herein and the simultaneous sealing through insertion of the tube or the end of the tube into another is particularly practical.

Figure 6:
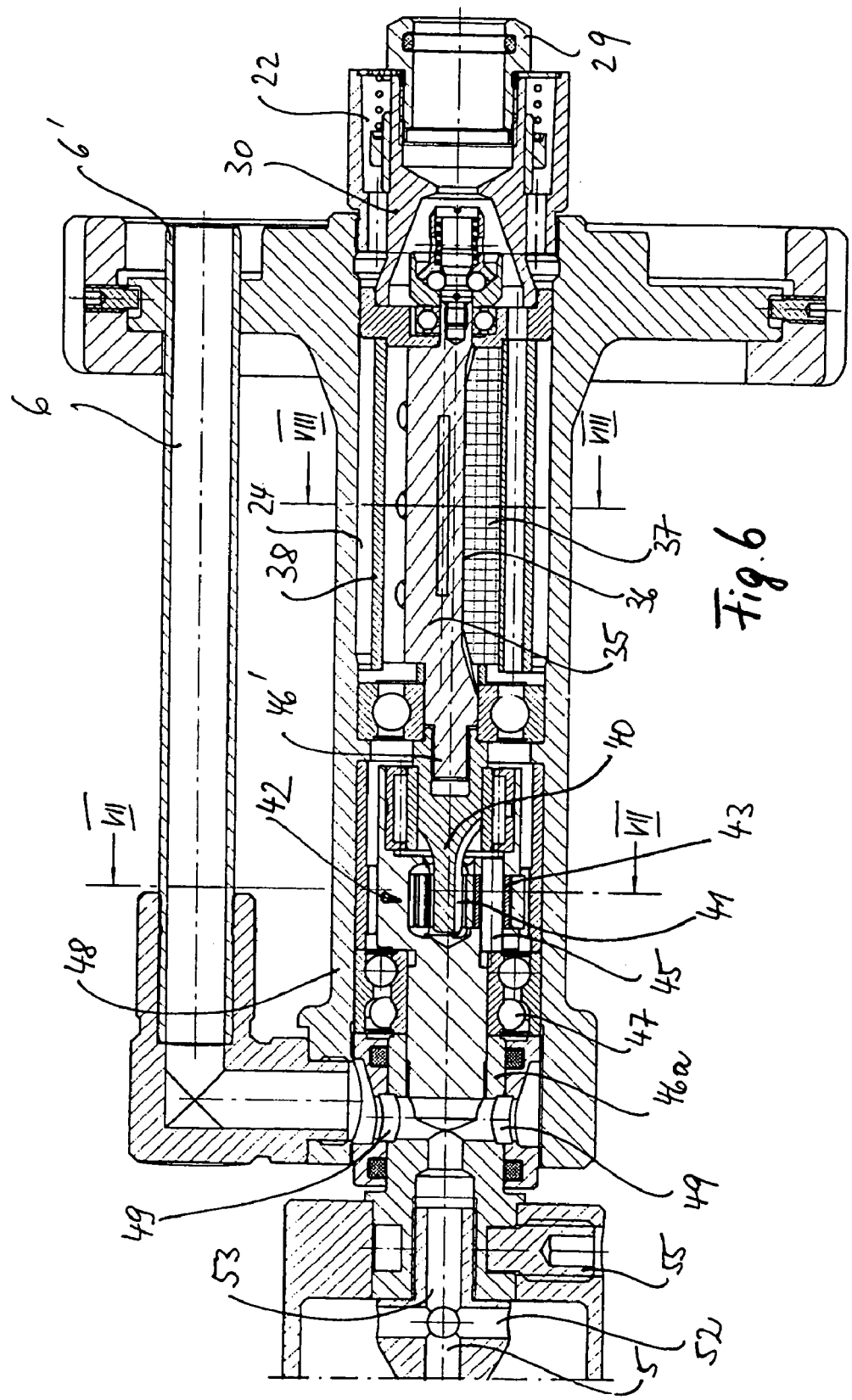
FIG. 6 is an enlarged region of the section according to FIG. 3.
Figure 8:
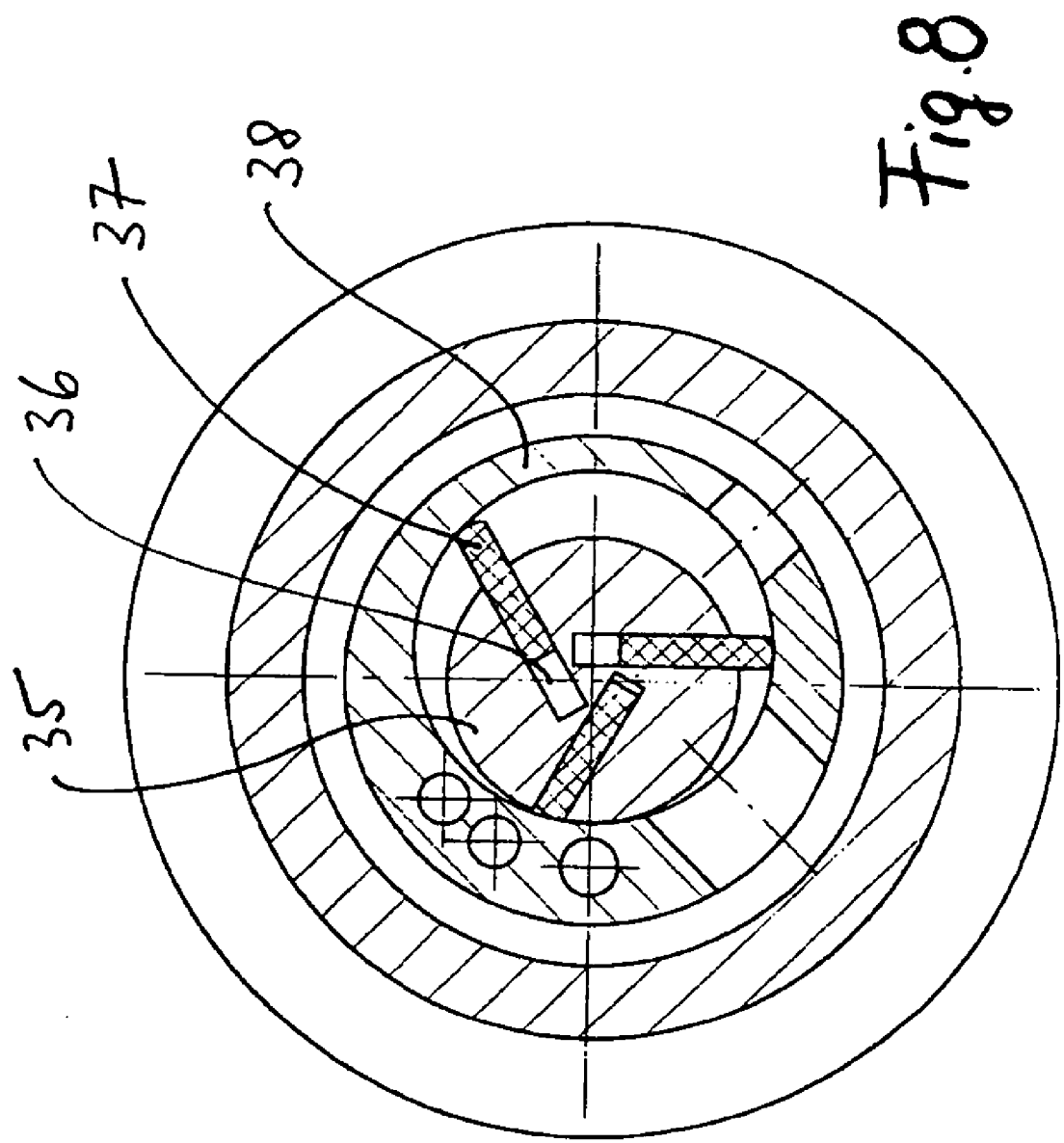
FIG. 8 is a section in the direction of arrow VIII—VIII of FIG. 6.

As can be best seen from FIGS. 6 and 8, the pressurized air motor 25 has a rotor 35 having a plurality of slots 36 disposed about its periphery at mutual separations. Blade-like sliders 37 are disposed in the slots 36 and can be displaced in a radial direction by means of centrifugal force. The rotor 35 and the slider 37 are borne in an eccentric bore in a bushing 38 so that a region is defined between the rotor 35 and the bushing 38 which has a sickle shaped cross-section in which or through which the pressurized air enters by means of air entrance openings (not explicitly shown) to then act on the sliders 37 in the direction of increased size of the region to thereby drive the pressurized air motor 35. The air then enters into the exhaust channels 24 by means of air exit openings (not explicitly shown), which are displaced relative to the air input openings, and enters into the exhaust channel 24. Such pressurized air motors are known to one of average skill in the art (e.g. EP1457680A1) so that a detailed description is not necessary here.

Figure 7:
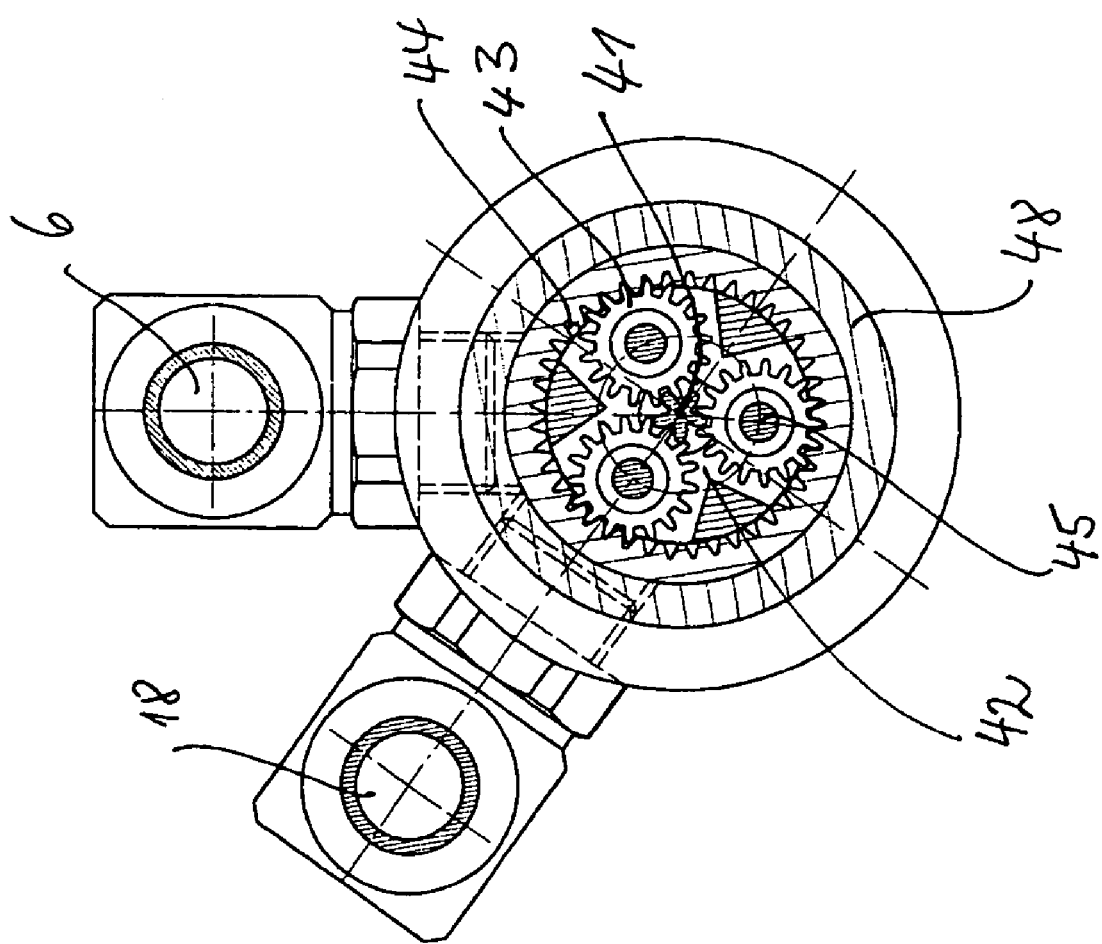
FIG. 7 is a section in the direction of arrow VII—VII of FIG. 6.

As can be further seen from FIG. 6, a shaft section 40 is screwed to the rotor 35 of the pressurized air motor 25 by means of screw 46' and bears the sun gear 41 of a planetary gearing 42 (see also FIG. 7) which engages three planetary wheels 43 which, for their part, engage a hollow wheel 44. The planetary wheels 43 are disposed on axles 40 which are connected to the planetary wheel bearing 46. The planetary wheel bearing is borne in housing 48 by means of bearing 47. The planetary gearing 42 reduces the rate of revolution of the pressurized air motor 25 from approximately 17,000 revolutions/minute to approximately 1,400 revolutions/minute. The knife receptacle 46a driven by the planetary gear bearing 46 has openings 49 about its periphery to connect the interior 50 of the receptacle 46a to the vacuum connecting tube 6 and the water connecting tube 18. Moreover, the interior 50 of the receptacle 46a is connected to the channels 51, 52 and 53 in the guiding arbor 4. The receptacle 46a is attached to the bushing 54 using bolts 55. The bushing 54 bears the hollow cylindrical cutting knife 3 (FIG. 3) on its left open end. Moreover, the guiding arbor 4 is disposed in the receptacle 46a and rotates along therewith.

When a vacuum from a vacuum source is connected to the connecting openings 11 via a connecting tube or the like, this vacuum is applied to the channels 51, 52 and 53 via the connecting tube 6 and the openings 49. When the hollow cylindrical cutting knife 3 and the guiding arbor 4 are rotated, the colon of a slaughter animal can be cut free. This procedure is interrupted at regular time intervals and the entire device is introduced by the robot into a sterilizing unit (not shown). Sterilization is started when the water inlet to the connecting openings 12 is fed via a tube or a hose. During the sterilizing procedure via the connecting openings 12, the water connecting tube 18 and the openings 49, the channels 51, 52 and 53 as well as the entire region of the chamber 54 and the hollow cylindrical cutting knife 3 are washed.

The blade-edge angle $\alpha$ of the cutting knife has as a value between 18 degrees and 22 degrees, preferentially 20 degrees, and utilizes stainless steel 1.4112 (hardened). The cutting edge 3 has an inner diameter 1 of 50 to 60 mm, preferentially 54 mm, with an entire overall length L of the cutting knife 53 and the bushing 54 of 145–155 mm, preferentially 149 mm. These dimensions have turned out to be particularly advantageous.

I claim:

1. A device for cutting free a colon of a slaughter animal, the device comprising;
    a) an attachment plate having means for connection to a robot and comprising, a first passage having a first opening for connection to a vacuum source, a second passage having a second opening for connection to a water supply, a third passage having a third opening for connection to a pressurized air supply, and a fourth passage having a fourth opening for connection to an air exit;
    b) a tool for separating the colon of the animal from surrounding tissue, said tool including,
        aa) a cylindrical hollow cutting knife,
        bb) a pressurized air motor for rotating said hollow cylindrical knife, said motor driven by pressurized air supplied by a supply means and exhausted by an exhaust means,
        cc) a guiding arbor extending into said hollow cutting knife,
        dd) a first operatively tube connected to said hollow cutting knife and/or to a channel in said arbor, said first tube for evacuating a contents of an intestine of the animal,
        ee) a second for tube supplying water to said hollow cylindrical knife and/or to said channel; and
    c) means for joining said tool to said attachment plate in a separable fashion such that said supply means for pressurized air of said tool are directly connected to said third passage of said attachment plate, said exhaust means of said tool are directly connected to said fourth passage of said attachment plate, said first tube of said tool is directly connected to said first passage of said attachment plate, and said second tube is directly connected to said second passage of said attachment plate.

2. The device of claim 1, wherein said first passage is partially defined by a protrusion projecting into said tool and sealed at an end of said first tube.

3. The device of claim 2, wherein said first tube is connected to an interior of a receptacle via openings, said receptacle being driven by said pressurized air motor, wherein said receptacle is connected to said first tube in said guiding arbor and to an interior of said cutting knife.

4. The device of claim 1, wherein said second passage in said attachment plate is connected to a channel having an end into which said second tube projects and is sealed.

5. The device of claim 4, wherein said second tube is connected, via openings, to an interior of a receptacle driven by said pressurized air motor, said receptacle being connected to said evacuating tube in said guiding arbor and to an interior region of said cutting knife.

6. The device of claim 1, wherein a position of said tool at said attachment plate is defined by engagement between an end of said second tube disposed in said tool and an associated channel in said attachment plate.

7. The device of claim 1, wherein a position of said tool at said attachment plate is defined by engagement of an end of said first tube and an associated channel in said attachment plate.

8. The device of claim 1, wherein said third passage passes through a central channel in said attachment plate to guide pressurized air to said pressurized air motor.

9. The device claim 1, wherein said fourth passage is connected to an angular region in said attachment plate which communicates with said exhaust means of said pressurized air motor via an annular space fashioned in said tool.

10. The device of claim 1, wherein said exhaust means has exhaust channels, guided in an outer periphery of said pressurized air motor, and connected to an annular region at an end of said tool facing said attachment plate.

11. The device of claim 8, further comprising a pressure regulating valve disposed in said tool at an intake of pressurized air to said pressurized air motor.

12. The device of claim 1, wherein said pressurized air motor drives a planetary wheel bearing via a planetary gear to reduce a rate of rotation of said pressurized air motor, wherein a receptacle for said hollow cylindrical cutting knife and said guiding arbor is borne on said planetary wheel bearing.

13. The device of claim 1, wherein said tool is attached to said attachment plate via a union nut disposed on said tool to engage a thread on said attachment plate.

14. The cutting knife of claim 1, wherein a blade edge angle ($\alpha$) of said hollow cylindrical cutting knife is between 18 and 20 degrees.

15. The cutting knife of claim 14, where in said angle is 20 degrees.

16. The cutting knife of claim 14, wherein a diameter of said cutting knife is 50 to 60 mm.

17. The cutting knife of claim 16, wherein said diameter is 54 mm.

18. The cutting knife of claim 14, wherein an overal length of said cutting knife and a hollow cylindrical bushing bearing said cutting knife is 145–154 mm.

19. The cutting knife of claim 18, wherein said length is 149 mm.

* * * * *